United States Patent
Köllner et al.

(10) Patent No.: US 8,314,575 B2
(45) Date of Patent: Nov. 20, 2012

(54) METHOD AND DEVICE FOR DETERMINING A DRIVE FORCE PRODUCED BY AN ELECTRIC MOTOR

(75) Inventors: Wolfgang Köllner, Vienna (AT); Roman Morawek, Vienna (AT); Martin Meissl, Vienna (AT); Peter Stephan Mulacz, Pottenbrunn (AT)

(73) Assignee: Continental Automotive GmbH, Hannover (DE)

( * ) Notice: Subject to any disclaimer, the term of this patent is extended or adjusted under 35 U.S.C. 154(b) by 597 days.

(21) Appl. No.: 12/518,476

(22) PCT Filed: Dec. 4, 2007

(86) PCT No.: PCT/EP2007/063243
§ 371 (c)(1),
(2), (4) Date: Sep. 23, 2009

(87) PCT Pub. No.: WO2008/071593
PCT Pub. Date: Jun. 19, 2008

(65) Prior Publication Data
US 2010/0026224 A1    Feb. 4, 2010

(30) Foreign Application Priority Data
Dec. 14, 2006    (DE) .................. 10 2006 059 145

(51) Int. Cl.
*H02H 7/08*    (2006.01)

(52) U.S. Cl. ............... 318/400.21; 318/400.11; 318/432

(58) Field of Classification Search ............. 318/400.21, 318/400.11, 432, 433, 434, 400.1; 180/65.25
See application file for complete search history.

(56) References Cited

U.S. PATENT DOCUMENTS

| | | | |
|---|---|---|---|
| 6,150,782 A | 11/2000 | Breitling et al. | |
| 2007/0106429 A1* | 5/2007 | Endo et al. | 701/1 |
| 2007/0214722 A1 | 9/2007 | Oxle et al. | |

FOREIGN PATENT DOCUMENTS

| | | |
|---|---|---|
| DE | 4008002 A1 | 9/1991 |
| DE | 19612596 A1 | 10/1997 |
| DE | 19944964 A1 | 3/2001 |
| DE | 102004025789 A1 | 12/2005 |
| FR | 2663798 A1 | 12/1991 |
| WO | WO2005111747 A1 | 11/2005 |

OTHER PUBLICATIONS

International Search Report, PCT/EP2007/063243, 11 pages.
German Office Action, DE102006059145.3-52, 5 pages.

* cited by examiner

*Primary Examiner* — Karen Masih
(74) *Attorney, Agent, or Firm* — King & Spalding L.L.P.

(57) ABSTRACT

In order to determine a drive force (FAct) produced by an electric motor, the motor current (Ia) supplied to the electric motor (10) from a power supply source (32) is measured and a force is calculated from this; in addition, the motor voltage (UBat) applied to the electric motor (10) is measured, and drive force fluctuations which result from voltage fluctuations that occur during operation of the power supply source are compensated for, with at least one compensation force component being determined which is based on the measured motor voltage (UBat), including voltage fluctuations.

14 Claims, 3 Drawing Sheets

METHOD AND DEVICE FOR DETERMINING A DRIVE FORCE PRODUCED BY AN ELECTRIC MOTOR

CROSS-REFERENCE TO RELATED APPLICATIONS

This application is a U.S. National Stage Application of International Application No. PCT/EP2007/063243 filed Dec. 4, 2007, which designates the United States of America, and claims priority to German Application No. 10 2006 059 145.3 filed Dec. 14, 2006, the contents of which are hereby incorporated by reference in their entirety.

TECHNICAL FIELD

The invention relates to a method for determining a drive force produced by a rotating electric motor.

BACKGROUND

The invention also relates to a device comprising an electric motor and force-determining means for determining a drive force produced by an electric motor during operation.

Finally, the invention also relates to a mechanism for limiting the closing force of a component of a motor vehicle, which is driven with the aid of an electric motor, comprising such a device.

Determination of a drive force produced by a rotating electric motor can often be of interest and is particularly significant in motor vehicles if the movement of a component of a motor vehicle, such as a window or a sliding roof in particular, but also a vehicle seat, etc., is to be detected. One particular application in this connection is monitoring in terms of trapping of body parts, and generally objects, by the moved component, a corresponding reaction to limit or switch off the drive force (closing force) then being provided in order to avoid damage. Optimally accurate detection of the drive force is required for a closing force limitation of this kind, for example in the case of sliding roofs or window openers.

To limit the closing force, the procedure is conventionally such that measured values based on the speed of the drive movement (or preferably the rotational speed of the electric motor) are provided with the aid of Hall sensors in order to draw conclusions about the exerted forces from these, cf. for example FR 2663798 A. Furthermore, it has also already been proposed to measure the motor current and define a threshold value for determining a trapped state. This proposal is more advantageous insofar as no Hall sensors are required, so the apparatus-related complexity and costs are reduced. The estimated correlative force value $F_{Act}$ should be proportional to the current in this case, for instance according to the following equation:

$$F_{Act} = \frac{\ddot{u}}{r} * k_m * I_a \quad (1)$$

The term $$\frac{\ddot{u}}{r} * k_m$$

herein can be replaced by a correction or proportionality factor $k_x$, so equation (1) can also be written as follows:

$$F_{Act} = k_x * I_a$$

In the above equation (1) $F_{Act}$ designates the drive force to be determined, for example on the cable pull of the window opener, ü designates the gear ratio, r the radius of the cable drum of the drive system for the window opener and $k_m$ a motor torque constant. $I_a$ moreover designates the motor current.

One problem in this connection is that it is not possible to more accurately estimate the drive force in terms of a possible trapping incident as the power supply source, in the case of motor vehicles the motor vehicle battery in other words, is frequently affected by voltage fluctuations. Voltage fluctuations of this kind, for example in the form of sudden voltage jumps, naturally have an effect on the motor current and therewith on detection of the drive force and prevent smooth operation, for example in the case of limiting the closing force on a motor vehicle component.

SUMMARY

According to various embodiments a remedy for this can be developed and a method can be proposed with which the effects of such voltage fluctuations, in particular dynamic changes in voltage, but also static changes in voltage, can be compensated when determining the drive force.

According to various embodiments, a method and a device of the disclosed type can be provided, where, with low expenditure, an optimally uniform force level that is required for distinguishing frictional forces in the system and clamping forces can be determined on the basis of compensation, i.e. it should be possible to fix a value corresponding to the drive force independently of such voltage fluctuations.

According to an embodiment, in a method for determining a drive force produced by a rotating electric motor, the motor current supplied to the electric motor from a power supply source is measured and a force is calculated from this, wherein the motor voltage applied to the electric motor is also measured, and the drive force fluctuations which result from voltage fluctuations that occur during operation of the power supply source are compensated, at least one compensation force component is determined which is based on the measured motor voltage, including voltage fluctuations.

According to a further embodiment, the measured motor voltage can be low-pass filtered and may be used as the filtered motor voltage for determining the compensation force component. According to a further embodiment, to compensate dynamic voltage fluctuations the difference between the filtered motor voltage and the measured motor voltage can be formed and the associated dynamic compensation force component can be calculated from this difference. According to a further embodiment, the dynamic compensation force component can be calculated by multiplying the difference by a pre-determined proportionality factor. According to a further embodiment, to compensate static voltage fluctuations the voltage difference between a maximum motor voltage and the filtered motor voltage can be formed and the associated static compensation force component can be calculated from the voltage difference. According to a further embodiment, the static compensation force component can be calculated by multiplying the voltage difference by a predetermined proportionality factor. According to a further embodiment, the determined drive force, including the compensation force component, may be compared with a specified threshold value for the purpose of force limitation. According to a further embodiment, the force limitation may limit a closing force for a driven component, for example a window or a sliding roof, of a motor vehicle.

According to another embodiment, a device may comprise force-determining means to be associated with an electric motor for determining a drive force produced by the electric motor during operation, the force-determining means being connected to motor current measuring means, characterized in that the force-determining means are connected moreover to means for measuring the motor voltage and have means for determining at least one additional force component used to compensate voltage fluctuations on the basis of the measured motor voltage, including voltage fluctuations.

According to a further embodiment, the force-determining means may have low-pass filtering means for low-pass filtering the measured motor voltage, the low-pass filtered motor voltage being used when determining the compensation force component. According to a further embodiment, the device may comprise means for forming the difference between the low-pass filtered motor voltage and the measured motor voltage, the force-determining means being constructed to determine a compensation force component from this difference to compensate forces on the basis of dynamic voltage fluctuations. According to a further embodiment, the device may comprise a multiplying module for multiplying the difference by a predetermined proportionality factor to calculate the compensation force component. According to a further embodiment, the device may comprise means for forming the voltage difference between a maximum motor voltage and the low-pass filtered motor voltage, the force-determining means being constructed to determine a compensation force component from this voltage difference to compensate forces on the basis of static voltage fluctuations. According to a further embodiment, the device may comprise a multiplying module for multiplying the difference by a predetermined proportionality factor to calculate the compensation force component.

According to yet another embodiment, a mechanism for limiting the closing force of a component of a motor vehicle that is driven with the aid of an electric motor, may comprise such a device as described above and comprise threshold value means for comparing the determined drive force of the electric motor, while taking account of the at least one compensation force component, with a specified threshold value, motor control means being connected to the threshold value means to reduce or switch off the motor output when the threshold value is reached.

BRIEF DESCRIPTION OF THE DRAWINGS

The invention will be described in more detail hereinafter with the aid of preferred exemplary embodiments, to which it is not limited, however, and with reference to the accompanying drawings. In detail in the drawings.

DETAILED DESCRIPTION

Figure 1:
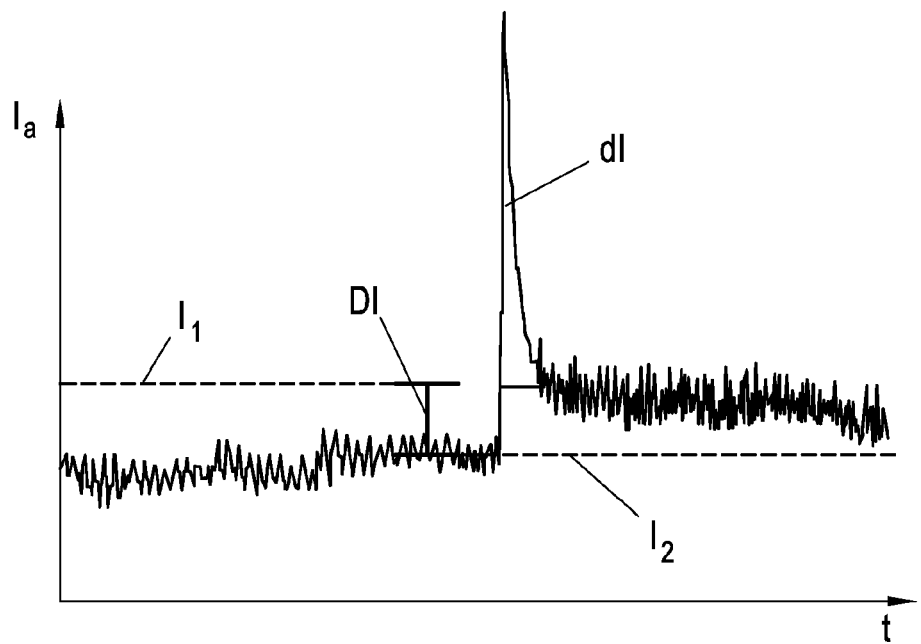
FIG. 1 shows an example of a motor current in the case of an electric motor, which drives a window opener, having current fluctuations resulting from changes in voltage.

Furthermore, the various embodiments also provide a mechanism for limiting the closing force of a component of a motor vehicle that is driven with the aid of an electric motor, such as a window or a sliding roof in particular, comprising a device of this kind, threshold value means for comparing the determined drive force of the electric motor, while taking account of the compensation provided according to various embodiments, with a specified threshold value being provided moreover, with motor control means being connected to the threshold value means to reduce or switch off the motor output when the threshold value is reached.

With the aid of the various embodiments it is possible to easily distinguish between clamping forces and frictional forces in the drive system, it simultaneously being possible to take account of the fact that when estimating and determining the force value on the basis of the motor current measurement, the result depends not only on the frictional forces, etc. that are to be overcome but also on gradually changing voltage levels or on sudden voltage jumps which lead to corresponding current differences. These sudden dynamic or static current differences, and therefore also force differences, are taken into account on the basis of the compensation various embodiments in such a way that, as far as possible, the finally obtained force value does not include any fractions caused by such voltage or current fluctuations. To be able to carry out the desired force compensation in a particularly easy manner in terms of calculation the measured motor voltage can be low-pass filtered and as the filtered motor voltage this is used when determining the compensation force component.

In detail the procedure can be such that in the case of dynamic voltage fluctuations the difference between the filtered motor voltage and the measured motor voltage is formed and the associated dynamic compensation force component is calculated from this difference, in particular by multiplying by a predetermined correction or proportionality factor.

In a comparable manner, to compensate static voltage fluctuations the voltage difference between a maximum motor voltage and the filtered motor voltage can be formed, the associated static compensation force component then being calculated from this voltage difference, again expediently by multiplying by a predetermined proportionality or correction factor.

It should be mentioned here that where in the present connection a motor voltage, a motor current, a drive force or a force component, etc. are mentioned, for the sake of simplicity these obviously should be taken to mean that values or signals based on these physical variables are used as the basis. This is particularly significant if it is borne in mind that, in addition to using specific circuit components, the present form of determining the drive force can in particular also take place with the aid of computer means where, after appropriate digitization of the input values, the desired calculations, such as low-pass filtering in particular, are carried out. In this regard the low-pass means for low-pass filtering of the measured motor voltage can also be implemented by a calculation module inside the computer means or by the software thereof.

As mentioned in the introduction, the present technique is used particularly advantageously in limiting the closing force of a component of a motor vehicle, such as a window or a sliding roof in particular, in order to be able to reliably avoid injury to people, which can sometimes be serious.

FIG. 1 shows an example of the characteristic over time of a motor current $I_a$ recorded by an electric motor, in particular a d.c. motor, in a system comprising a mechanism for driving a window opener with limitation of the drive force. It is evident therein that, by way of example, there is a static difference DI between mean levels $I_1$ and $I_2$ of the motor current $I_a$ on the one hand, and a dynamic difference DI on the other hand, the dynamic change in current dI resulting owing to sudden, erratic changes in voltage, as will also be described in more detail hereinafter with reference to FIG. 4.

By way of precaution it should be noted that the example of limiting the closing force in the case of a window opener given here should not be taken to be limiting, instead the invention may also be advantageously employed in other regions where the drive force of an electric motor is to be detected.

If a current characteristic of the kind as shown in FIG. 1 is used as the basis when calculating the drive force $F_{Act}$, as disclosed above by equation (1), this results in unreliable detection of the drive force of the electric motor, and this is problematic primarily in view of the possible limitation of the closing force in the case of a motor vehicle window or sliding roof. According to the various embodiments it is not just the motor current $I_a$ which is used when determining the drive force $F_{Act}$ therefore, but also the motor voltage in order to eliminate by compensation the fractions which result from voltage fluctuations and which are to be ignored when determining the drive force $F_{Act}$.

Figure 2:
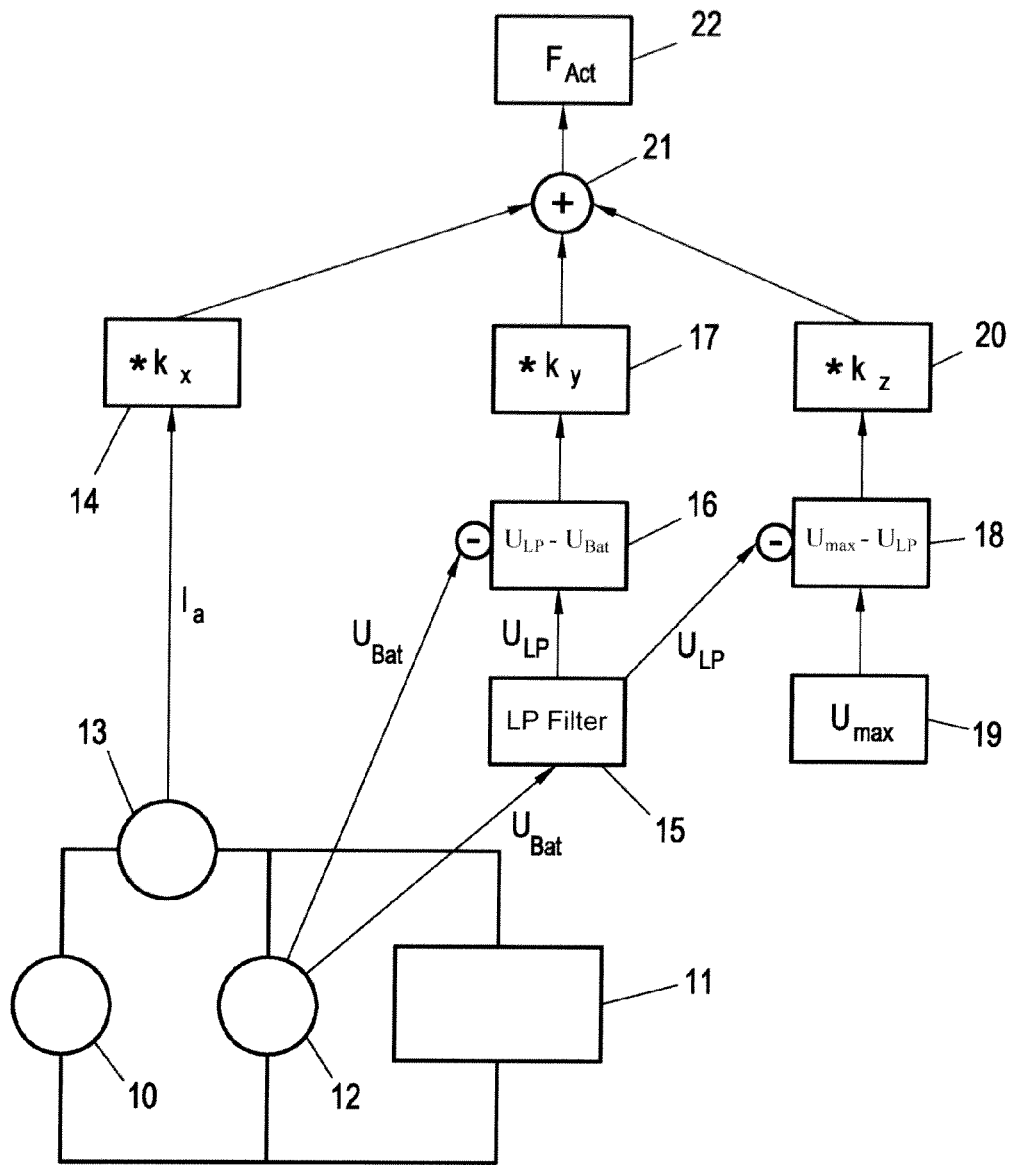
FIG. 2 shows a diagram of the technique of determining the drive force of the electric motor in a window opener system according to an embodiment.

FIG. 2 schematically shows the technique for determining the "adjusted" drive force $F_{Act}$ with compensation or elimination of the fractions that can be attributed to voltage fluctuations. In detail an electric motor 10, namely a d.c. motor, including associated control and power supply means 11, is shown. Voltage measuring means 12 for measuring the motor voltage $U_{Bat}$, and current measuring means 13 for measuring the motor current $I_a$ are associated with the electric motor 10. In a step 14 the measured motor current $I_a$ is multiplied by a correction factor or proportionality factor $k_x$, as disclosed above, to arrive at the base force fraction $k_x*I_a$ of the drive force $F_{Act}$ to be determined according to present equation (1).

The motor voltage $U_{Bat}$ is supplied to a step 15 where low-pass filtering is carried out, the low-pass filtered voltage obtained thereby being designated $U_{LP}$. The difference between the low-pass filtered motor voltage $U_{LP}$ and the measured motor voltage $U_{Bat}$ i.e. $(U_{LP}-U_{Bat})$ is then formed in subtraction means corresponding to a step 16, and this difference $(U_{LP}-U_{Bat})$ is then multiplied in a step 17 by a correction or proportionality factor $k_y$ in order to thus arrive at a corresponding force component value $k_y*(U_{LP}-U_{Bat})$.

On the other hand, the voltage difference $(U_{max}-U_{LP})$ is formed from the low-pass filtered motor voltage $U_{LP}$ and a specified constant parameter, the maximum motor voltage $U_{max}$, cf. step 19 in FIG. 2, in subtraction means corresponding to an additional step 18, and this voltage difference $(U_{max}-U_{LP})$, which is always positive, is multiplied by a correction or proportionality factor $k_z$ in a corresponding step 20. Then, according to a step 21, all three force components $k_x*I_a$, $k_y*(U_{LP}-U_{Bat})$ and $k_z*(U_{max}-U_{LP})$ are totaled to finally obtain in step 22 the value for the drive force $F_{Act}$ with compensation of fractions which result from voltage fluctuations and are included in the second and third terms with reverse signs, as basically described above with reference to FIG. 1.

The above equation (1) is therefore modified as follows in accordance with the above statements:

$$F_{Act}=k_x*I_a+(U_{LP}-U_{Bat})*k_y+(U_{max}-U_{LP})*k_z$$

In this equation (2) $U_{Bat}$, as mentioned, represents the measured motor voltage, $U_{LP}$ the low-pass filtered motor voltage and $U_{max}$ the maximum supply voltage. The factor $k_y$ moreover designates a correction factor for the dynamic voltage difference and $k_z$ a correction factor for a static voltage difference.

From the above it therefore emerges that two types of voltage fluctuations are taken into account and compensated in the preferred exemplary embodiment described, namely static differences on the one hand (see difference DI in FIG. 1) and dynamic differences on the other hand (see difference dI in FIG. 1). In the case of a static difference in the voltage or voltage fluctuation, the changed voltage level leads to a corresponding change in the current level. To be able to take account of a corresponding correct force value in the case of different voltages, for instance in the case of a closing force limitation, a value which is proportional to the voltage, is therefore additively and subtractively added to the corresponding force value. In detail, in the case of static voltage fluctuations it is the term $k_z*(U_{max}-U_{LP})$ which is determined and taken into account as the compensation force component. If the low-pass filtered motor voltage is $U_{LP}=U_{max}$ this means that there is no static voltage difference, the difference value is 0 and therefore this compensation force value is also 0. If the low-pass filtered voltage value $U_{LP}$ is lower than the maximum voltage $U_{max}$, then according to the formed difference a compensation value is added to the term $k_x*I_a$ (which includes a fraction corresponding to this static voltage fluctuation), a corresponding multiplication factor $k_z$ being used in view of the conversion from voltage to force (also in the appropriate size).

In the case of dynamic changes in voltage, current peaks result according to FIG. 1 which may be positive, as FIG. 1 shows, or negative depending on whether the motor voltage suddenly increases or reduces. In this case, according to FIG. 2, the low-pass filtered voltage $U_{LP}$ (which does not include the high-frequency voltage fractions) is compared with the unfiltered voltage $U_{Bat}$ and the difference between these two voltage values is used as stated in order to account for the compensation of this fraction of the drive force that reflects the dynamic changes in voltage in the term $k_x*I_a$. It is essential that, depending on whether $U_{LP}$ is greater or less than $U_{Bat}$, a positive or negative value of this compensation force component is obtained for the case of dynamic changes in voltage or changes in current.

The voltage difference $(U_{LP}-U_{Bat})$ is also multiplied in this case by a correction or proportionality factor $k_y$ to arrive from the respective voltage value at a force value with the appropriate dimension and correct amplitude, in corresponding parameterization.

Said low-pass filtering, cf. step 15 in FIG. 2, of the motor voltage can be implemented using a conventional filter circuit, as in hardware, and likewise using a corresponding software component. In the latter case corresponding digitization of the motor voltage is obviously necessary, although this is not shown in more detail in FIG. 2 for the sake of simplicity. The other measured quantities, such as the motor current $I_a$ and the motor voltage $U_{Bat}$ itself, are then expediently also processed in digitized from in the case of subtraction and multiplication.

Figure 3:
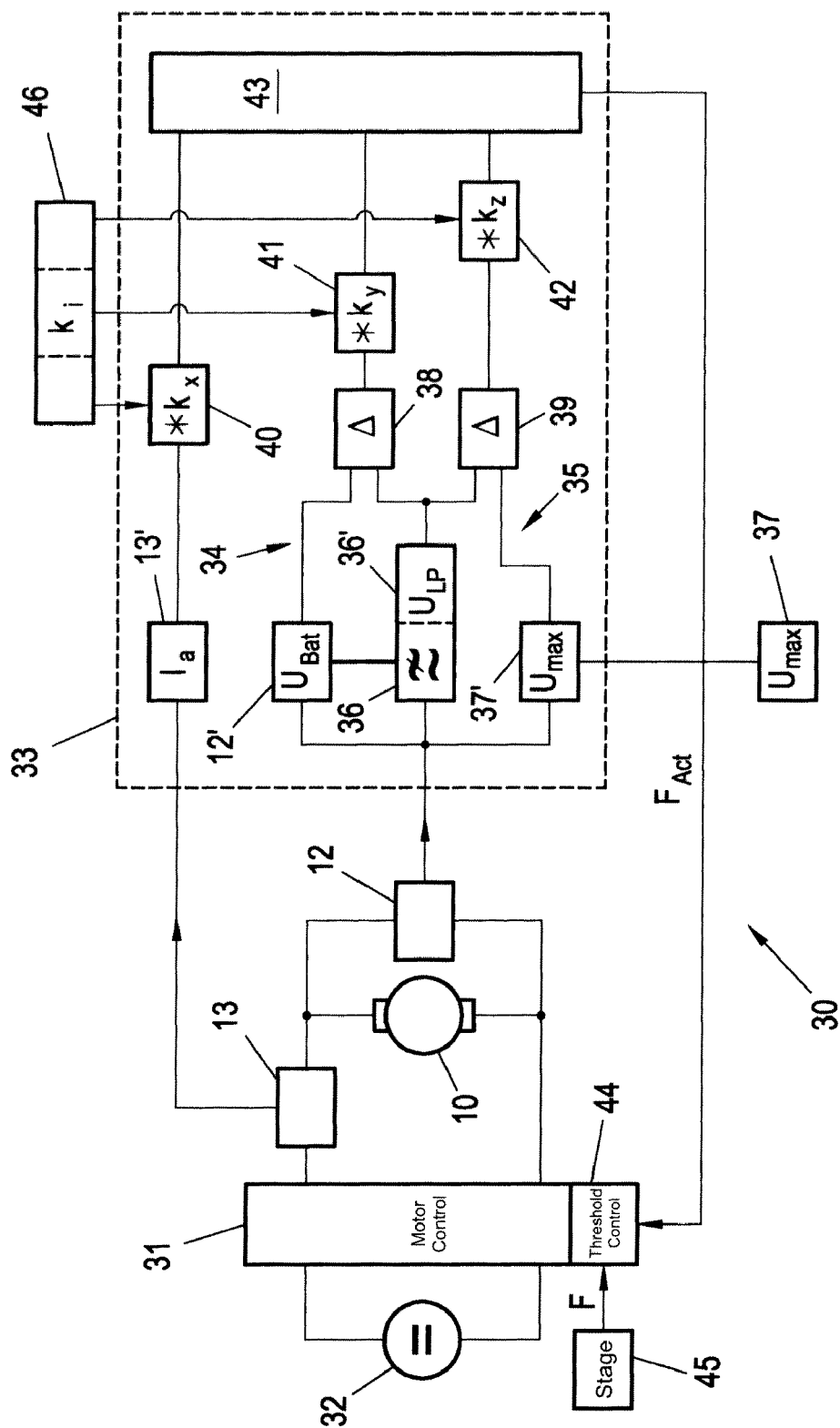
FIG. 3 shows in the form of a schematic block diagram a device for determining the drive force of an electric motor as part of a mechanism for limiting the closing force.

FIG. 3 shows in the manner of a block diagram a mechanism 30 (hereinafter also called a CFL mechanism for short) for limiting the closing force of a window or window opener (not shown) with the aid of the electric motor 10 and a transmission (not shown in more detail), in particular with cable drum and cable pull (CFL=closing force limitation). Control means 21 for the electric motor 10 and a power supply source 32 are provided, the latter being formed by a motor vehicle battery in the present example. The CFL mechanism 30 also includes means 33 for determining the drive force $F_{Act}$ by carrying out compensation as already described above. As mentioned, the motor current measuring means 13 (an ampere measuring device 13) on the one hand and the motor voltage measuring means 12 (a voltage measuring device 12) on the other hand are associated with the electric motor 10. The force-determining means 33 are connected to the outputs of these two measuring devices 12, 13 and have means 34, 35 for determining additional force components for the purpose of compensation.

In detail these means 33 and 34, 35 include low-pass filtering means 36 for low-pass filtering of the motor voltage $U_{Bat}$, measured using voltage measuring means 12, and furthermore a $U_{max}$ input stage 37 for stipulating the maximum supply voltage $U_{max}$ which is present at an input stage 37. Subtraction means 38 and 39 for forming the differences $U_{LP}-U_{Bat}$ and $U_{max}-U_{LP}$ stated above are provided moreover and multiplying modules 40, 41 and 42 are connected to these subtraction means 38 and 39 and to a current input stage 13', which is connected to the current measuring means 132, to multiply the corresponding variables $I_a$, $U_{LP}-U_{Bat}$ and $U_{max}-U_{LP}$ by the correction or proportionality factors $k_x$, $k_y$ and $k_z$. These multiplication modules 40, 41, 42 are then applied with their outputs to a summing module 43 which adds the three products to one another in accordance with the above equation (2) to thus emit a signal at one output which corresponds to the drive force $F_{Act}$ obtained following compensation and which is supplied to the motor control means 31. Here this signal $F_{Act}$ is compared with a specified force threshold value F, which is supplied by means of a stage 45, in threshold value means 44 to thus appropriately control the motor 10 via the motor control means 31 when the threshold value F is reached because there is obviously an excessively high drive force $F_{Act}$ as a result of a trapping incident. A safety cut-off or switching (reversing) of the motor 10 in particular can thus be brought about to prevent possible injury to a person who is trapped by some body part in the region of the moving motor vehicle part, in particular a side window.

Finally another correction factor specification stage 46 is evident from FIG. 3 with which said empirically or mathematically obtained proportionality factors $k_x$, $k_y$ und $k_z$ are specified.

Figure 4:
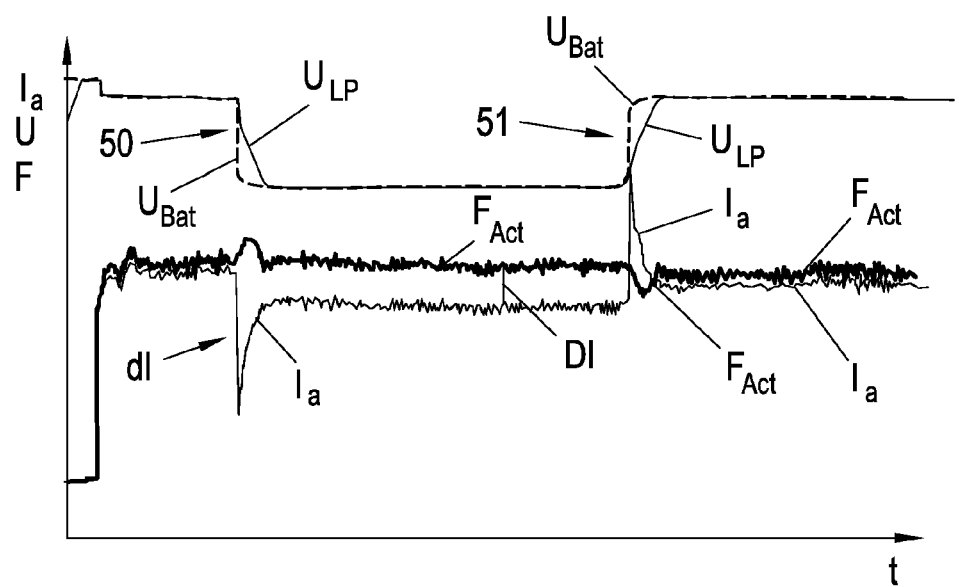
FIG. 4 shows in a graph the characteristic over time of a direct supply voltage with changes in voltage, the characteristic of the motor current that results in the process with corresponding fluctuations, the characteristic of the motor voltage after low-pass filtering and the characteristic of the determined force adjusted as a result of compensation with respect to the voltage fluctuations, as can be used as the basis for limiting the closing force of a window opener (or of other components) for instance.

FIG. 4 shows in a graph the characteristic of voltages and currents or forces and, more precisely, using the example of a stepped drop 50 in motor voltage $U_{Bat}$ with subsequent stepped renewed increase 51. In agreement with the principles described with reference to FIG. 1, a corresponding, initially negative, and then positive jump, as is also shown in FIG. 4, is then produced in the curve for the motor current $I_a$ at the change-in-voltage points 50, 51 of the curve for the motor voltage $U_{Bat}$. If the motor voltage $U_{Bat}$ is low-pass filtered correspondingly inclined slopes are produced in the voltage curve at the changes-in-voltage 50, 51, cf. the curve for the low-pass filtered motor voltage $U_{LP}$ in FIG. 4.

Overall the corresponding static and dynamic differences in motor current $I_a$ are produced, as shown in FIG. 4 at dI and DI.

If the above-described compensation is then carried out a current or drive force $F_{Act}$ (with appropriate conversion) is then obtained, as shown in FIG. 4 by the fourth curve, with one spike being given for this signal, irrespective of slight high-frequency fluctuations (namely as a result of motor commutator current ripples) and two comparatively small spikes of substantially constant value being given in the region of stages 50, 51 as a result of the jump in motor voltage $U_{Bat}$. This compensated drive force value $F_{Act}$ is reliably suitable, as may be understood directly, for checking the force, for instance when detecting situations where body parts or articles are trapped by driven components and an increase in force should therefore be registered, i.e. it is possible to reliably separate frictional forces in the drive system on the one hand and clamping forces on the other.

What is claimed is:

1. A mechanism for limiting the closing force of a component of a motor vehicle that is driven with the aid of an electric motor, comprising a device comprising force-determining means to be associated with an electric motor for determining a drive force produced by the electric motor during operation, the force-determining means being connected to motor current measuring means, wherein the force-determining means are connected moreover to means for measuring the motor voltage and have means for determining at least one additional force component used to compensate voltage fluctuations on the basis of the measured motor voltage including voltage fluctuations, and threshold value means for comparing the determined drive force of the electric motor, while taking account of the at least one compensation force component, with a specified threshold value, motor control means being connected to the threshold value means to reduce or switch off the motor output when the threshold value is reached.

2. The mechanism according to claim 1, wherein the force-determining means have low-pass filtering means for low-pass filtering the measured motor voltage, the low-pass filtered motor voltage being used when determining the compensation force component.

3. The mechanism according to claim 2, comprising means for forming the difference between the low-pass filtered motor voltage and the measured motor voltage, the force-determining means being constructed to determine a compensation force component from this difference to compensate forces on the basis of dynamic voltage fluctuations.

4. The mechanism according to claim 3, comprising multiplying module for multiplying the difference by a predetermined proportionality factor to calculate the compensation force component.

5. The mechanism according to claim 1, comprising means for forming the voltage difference between a maximum motor voltage and the low-pass filtered motor voltage, the force-determining means being constructed to determine a compensation force component from this voltage difference to compensate forces on the basis of static voltage fluctuations.

6. The mechanism according to claim 5, comprising a multiplying module for multiplying the difference by a predetermined proportionality factor to calculate the compensation force component.

7. A method for determining a drive force produced by a rotating electric motor, comprising the steps of:
Measuring the motor current supplied to the electric motor from a power supply source;
Calculating a force from the measured motor current;
Measuring the motor voltage applied to the electric motor; and
Compensating drive force fluctuations which result from voltage fluctuations that occur during operation of the power supply source, wherein at least one compensation force component being determined which is based on the measured motor voltage including voltage fluctuations;

wherein the measured motor voltage is low-pass filtered and is used as the filtered motor voltage for determining the compensation force component;

wherein to compensate dynamic voltage fluctuations the difference between the filtered motor voltage and the measured motor voltage is formed and the associated dynamic compensation force component is calculated from this difference.

8. A method according to claim 7, wherein the dynamic compensation force component is calculated by multiplying the difference by a pre-determined proportionality factor.

9. A method for determining a drive force produced by a rotating electric motor, comprising the steps of:

Measuring the motor current supplied to the electric motor from a power supply source;

Calculating a force from the measured motor current;

Measuring the motor voltage applied to the electric motor; and

Compensating drive force fluctuations which result from voltage fluctuations that occur during operation of the power supply source, wherein at least one compensation force component being determined which is based on the measured motor voltage including voltage fluctuations;

wherein the measured motor voltage is low-pass filtered and is used as the filtered motor voltage for determining the compensation force component;

wherein to compensate static voltage fluctuations the voltage difference between a maximum motor voltage and the filtered motor voltage is formed and the associated static compensation force component is calculated from the voltage difference.

10. A method according to claim 9, wherein the static compensation force component is calculated by multiplying the voltage difference by a predetermined proportionality factor.

11. A device comprising:

force-determining means to be associated with an electric motor for determining a drive force produced by the electric motor during operation;

the force-determining means connected to motor current measuring means;

wherein the force-determining means are connected to means for measuring the motor voltage and include means for determining at least one additional force component used to compensate voltage fluctuations on the basis of the measured motor voltage including voltage fluctuations;

wherein the force-determining means include low-pass filtering means for low-pass filtering the measured motor voltage;

the low-pass filtered motor voltage being used when determining the compensation force component; and means for forming the difference between the low-pass filtered motor voltage and the measured motor voltage;

the force-determining means constructed to determine a compensation force component from this difference to compensate forces on the basis of dynamic voltage fluctuations.

12. A device according to claim 11, further comprising a multiplying module for multiplying the difference by a pre-determined proportionality factor to calculate the compensation force component.

13. A device comprising:

force-determining means to be associated with an electric motor for determining a drive force produced by the electric motor during operation;

the force-determining means connected to motor current measuring means;

wherein the force-determining means are connected to means for measuring the motor voltage and include means for determining at least one additional force component used to compensate voltage fluctuations on the basis of the measured motor voltage including voltage fluctuations;

wherein the force-determining means include low-pass filtering means for low-pass filtering the measured motor voltage;

the low-pass filtered motor voltage being used when determining the compensation force component; and means for forming the voltage difference between a maximum motor voltage and the low-pass filtered motor voltage;

the force-determining means being constructed to determine a compensation force component from this voltage difference to compensate forces on the basis of static voltage fluctuations.

14. A device according to claim 13, further comprising a multiplying module for multiplying the difference by a pre-determined proportionality factor to calculate the compensation force component.

* * * * *

UNITED STATES PATENT AND TRADEMARK OFFICE
CERTIFICATE OF CORRECTION

PATENT NO. : 8,314,575 B2  
APPLICATION NO. : 12/518476  
DATED : November 20, 2012  
INVENTOR(S) : Wolfgang Köllner et al.

Page 1 of 1

It is certified that error appears in the above-identified patent and that said Letters Patent is hereby corrected as shown below:

<u>Title page,</u>  
Block (75) Inventors, "Vienna (AT)" should read -- WIEN (AT) --.

Signed and Sealed this  
Fifth Day of February, 2013

Teresa Stanek Rea  
*Acting Director of the United States Patent and Trademark Office*